United States Patent
Filsfils et al.

(10) Patent No.: US 10,506,083 B2
(45) Date of Patent: Dec. 10, 2019

(54) SEGMENT ROUTING GATEWAY STORING SEGMENT ROUTING ENCAPSULATING HEADER USED IN ENCAPSULATING AND FORWARDING OF RETURNED NATIVE PACKET

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/703,275

(22) Filed: Sep. 13, 2017

(65) Prior Publication Data
US 2018/0375684 A1  Dec. 27, 2018

Related U.S. Application Data

(60) Provisional application No. 62/525,439, filed on Jun. 27, 2017.

(51) Int. Cl.
*H04L 12/46* (2006.01)
*H04L 12/721* (2013.01)
(Continued)

(52) U.S. Cl.
CPC .......... *H04L 69/22* (2013.01); *H04L 12/4633* (2013.01); *H04L 12/4641* (2013.01);
(Continued)

(58) Field of Classification Search
CPC ..... H04L 12/4633; H04L 45/14; H04L 49/35; H04L 67/327
See application file for complete search history.

(56) References Cited

U.S. PATENT DOCUMENTS 8,520,672 B2   8/2013  Guichard et al.
9,112,723 B2   8/2015  Alexander, Jr. et al.
(Continued)

OTHER PUBLICATIONS

S. Deering and R. Hinden, "Internet Protocol, Version 6 (IPv6) Specification," RFC 2460, Dec. 1998, The Internet Society, Reston, VA, USA (thirty-nine pages).
(Continued)

*Primary Examiner* — Ronald B Abelson
(74) *Attorney, Agent, or Firm* — The Law Office of Kirk D. Williams (57) ABSTRACT

In one embodiment, a Segment Routing gateway receives Segment Routing packets encapsulating native packets. The Segment Routing gateway stores the Segment Routing encapsulating headers. The native packets are communicated to a service function (or other device). Upon return, Segment Routing packets are generated including the returned native packets using correspondingly stored Segment Routing encapsulating headers, possibly updated with new policies. Segment Routing includes, but is not limited to, SRv6 and SR-MPLS. In one embodiment, the native packet is sent from a physical interface of the SR gateway to the service function, and returned to the SR gateway on one of its physical interface(s). In one embodiment, shared storage is accessible to both the SR gateway and the service function (or other device), so references (e.g., memory locations or pointers) are communicated between the SR gateway and the service function (or other device).

20 Claims, 10 Drawing Sheets

(51) Int. Cl.
| | |
|---|---|
| H04L 12/935 | (2013.01) |
| H04L 29/08 | (2006.01) |
| H04L 29/06 | (2006.01) |
| H04L 12/741 | (2013.01) |
| H04L 29/12 | (2006.01) |
| H04L 12/931 | (2013.01) |
| H04L 12/749 | (2013.01) |
| H04L 12/26 | (2006.01) |

(52) U.S. Cl.
CPC .............. *H04L 45/14* (2013.01); *H04L 45/34* (2013.01); *H04L 45/74* (2013.01); *H04L 45/741* (2013.01); *H04L 49/35* (2013.01); *H04L 61/2007* (2013.01); *H04L 67/10* (2013.01); *H04L 67/327* (2013.01); *H04L 69/324* (2013.01); *H04L 43/028* (2013.01); *H04L 45/745* (2013.01); *H04L 61/2503* (2013.01); *H04L 61/6059* (2013.01); *H04L 63/0272* (2013.01); *H04L 2212/00* (2013.01)

(56) References Cited

U.S. PATENT DOCUMENTS

| | | |
|---|---|---|
| 2016/0380848 A1 | 12/2016 | Raney |
| 2017/0250908 A1* | 8/2017 | Nainar .................. H04L 12/741 |

OTHER PUBLICATIONS

J. Halpern, Ed. and C. Pignataro, Ed., "Service Function Chaining (SFC) Architecture," RFC 7665, Oct. 2015, The Internet Society, Reston, VA, USA (thirty-two pages).
P. Quinn, Ed. et al., "Network Service Header (NSH)," draft-ietf-sfc-nsh-20, Sep. 1, 2017, The Internet Society, Reston, VA, USA (thirty-four pages).
S. Previdei, Ed. et al. "IPv6 Segment Routing Header (SRH)," draft-ieff-6man-segment-routing-header-07, Jul. 20, 2017, The Internet Society, Reston, VA, USA (thirty-four pages).
Filsfils, Ed. et al., "Segment Routing Architecture," draft-ietf-spring-segment-routing-12, Jun. 20, 2017, The Internet Society, Reston, VA, USA (twenty-eight pages).
Filsfils et al., "Segment Routing Policy for Traffic Engineering," draft-filsfils-spring-segment-routing-policy-01.txt, Jul. 3, 2017, The Internet Society, Reston, VA, USA (thirty pages).
Filsfils et al., "SRv6 Network Programming," draft-filsfils-spring-srv6-network-programming-01, Jun. 28, 2017, The Internet Society, Reston, VA, USA (forty-two pages).
PCT International Search Report and Written Opinion, PCT Application PCT/US2018/039731, ISA/EP, European Patent Office, Netherlands, dated Nov. 13, 2018 (twenty-two pages).
PCT Invitation to Pay Additional Fees, PCT Application PCT/US2018/039731, ISA/EP, European Patent Office, Netherlands, dated Sep. 30, 2018 (eighteen pages).
PCT International Search Report and Written Opinion, PCT Application PCT/US2018/039731, ISA/EP, European Patent Office, Netherlands, dated Sep. 20, 2018 (eighteen pages).
Abdelsalam et al., "Implementation of Virtual Network Function Chaining through Segment Routing in a Linux-based NFV Infrastructure," arXiv.org, Apr. 20, 2017, XP055505386, DOI: arXiv:1702.05157v4, Cornell University Library, Ithaca, NY (ten pages).
Previdi et al., "IPv6 Segment Routing Header (SRH)," draft-ietf-6man-segment-routing-header-06, Mar. 13, 2017, The Internet Society, Reston, VA, USA (thirty-five pages).
Filsfls et al., "SRv6 Network Programming," draft-filsfils-spring-srv6-network-programming-00, Mar. 9, 2017, The Internet Society, Reston, VA, USA (forty-one pages).
David Lebrun, "Leveraging IPv6 Segment Routing for Service Function Chaining," Dec. 2015, ACM CoNEXT 2015 Student Workshop Proceedings, Heidelberg, Germany (two pages).

* cited by examiner

SEGMENT ROUTING GATEWAY STORING SEGMENT ROUTING ENCAPSULATING HEADER USED IN ENCAPSULATING AND FORWARDING OF RETURNED NATIVE PACKET

CROSS-REFERENCE TO RELATED APPLICATIONS

This application claims the benefit of U.S. Provisional Application No. 62/525,439, filed Jun. 27, 2017, which is hereby incorporated by reference in their entirety.

TECHNICAL FIELD

The present disclosure relates generally to sending of packets through a packet network, such as, but not limited to, according to Segment Routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with a Segment Routing (SR) gateway receiving SR packets, storing their SR encapsulating headers, communicating encapsulated native packets to a service function or other device, and encapsulating returned native packets in SR packets using the corresponding stored SR encapsulating headers, possibly updated with new policies.

One embodiment includes a method performed by a Segment Routing (SR) gateway that is SR-capable (e.g., it participates in Segment Routing). The SR gateway receives a SR packet encapsulating a native packet, such as, but not limited to, an Internet Protocol version 4 (IPv4) packet, Internet Protocol version 6 (IPv6) packet, Ethernet frame/packet, or other protocol packet. The SR packet includes a particular SR encapsulating header comprising a SRv6 segment identifier (SID) (e.g., according to SRv6) or Multiprotocol Label Switching (MPLS) segment (e.g., according to SR-MPLS). The particular SR encapsulating header is updated to a next SID or a next MPLS segment to send the SR packet. The SR encapsulating header is stored in storage. The native packet is communicated to a service function. In response to the SR gateway acquiring the native packet (e.g., after one or more services are applied) the service function: a particular SR packet is generated with the particular SR encapsulating header and with the particular SR packet encapsulating the native packet; forwarding information is determined based on the particular SR encapsulating header; and the particular SR packet is sent from the SR gateway according to the forwarding information.

In one embodiment, communicating the native packet includes the SR gateway sending the packet from the SR gateway, and said acquiring the native packet includes receiving the native packet by the SR gateway. In one embodiment, the storage is shared storage accessible to both the SR gateway and the service function, and communicating the native packet includes providing to the service function an outgoing reference to the native packet in the shared storage. In one embodiment, acquiring the native packet includes receiving an incoming reference to the native packet in said shared storage.

In one embodiment, the SR gateway receives a second SR packet related to the SR packet, with the second SR packet including a second particular SR encapsulating header. The particular SR encapsulating header in storage is updated based on the second particular SR encapsulating header (e.g., overwritten). In this manner, a new policy can be applied to the SR packet when the second particular SR encapsulating header is different than the particular SR encapsulating header.

In one embodiment, the service function applies a service to the native packet, which may or may not modify or drop the native packet. In one embodiment, the service includes firewall, intrusion detection, intrusion protection, security, parental control, network address translation, billing, or updating of information related to a size or other characteristic of the native packet.

2. Description

Disclosed are, inter alia, methods, apparatus, computer-storage media, mechanisms, and means associated with a Segment Routing (SR) gateway receiving SR packets, storing their SR encapsulating headers, communicating encapsulated native packets to a service function or other device, and encapsulating returned native packets in SR packets using the corresponding stored SR encapsulating headers, possibly updated with new policies. As used herein Segment Routing includes, but is not limited to SRv6 and SR-MPLS. Also, segment identifier (SID) refers to an IPv6 address in SRv6 and to an MPLS label in SR-MPLS.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Disclosed are, inter alia, methods, apparatus, computer-storage media, mechanisms, and means associated with a Segment Routing (SR) gateway receiving SR packets, storing their SR encapsulating headers, communicating encapsulated native packets to a service function or other device, and encapsulating returned native packets in SR packets using the corresponding stored SR encapsulating headers, possibly updated with new policies.

Figure 1A:
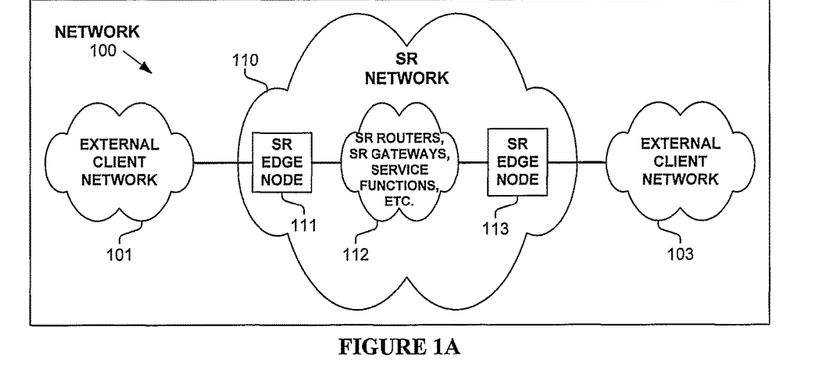
FIG. 1A illustrates a network operating according to one embodiment.

FIG. 1A illustrates network 100 operating according to one embodiment. As shown, network 100 includes client networks 101 and 103 (which are the same network in one embodiment) external to SR network 110, which includes SR edge nodes 111 and 113 and a network 112 of routers, SR gateways, and service functions. In response to receiving a native packet, a SR edge node 111, 113 identifies a SR policy (e.g., list of segments) through or to which to forward a SR packet encapsulating the native packet. These policies can change in response to network conditions, network programming, etc. SR edge nodes 111 and 113 also decapsulate native packets from SR packets and forward the native packets into network 101 and 103.

As used herein Segment Routing includes, but is not limited to, SRv6 and SR-MPLS. In one embodiment, segments (e.g., SRv6 SIDs or SR-MPLS segments) are advertised by a SR gateway on behalf of one or more service functions. In one embodiment, an MPLS-SR encapsulating header includes an MPLS label stack, with each label (e.g., MPLS SID) in the stack representing a segment. In one embodiment, an SRv6 encapsulating header includes an IPv6 header with a SR extension header containing a list of IPv6 addresses, each representing a segment. These segments are used to forward SR packets through a SR network, including to forward a SR packet to a SR gateway to have one or more services applied to a native packet encapsulated in the SR packet.

In one embodiment, a service function is implemented within or external to a router implementing a SR gateway, a virtualized service inside an isolated environment such as a virtual machine, container or namespace, or any generic process running on a server or other device. In one embodiment, the SR gateway and service function are implemented in a same appliance (e.g., a router, a server).

Figure 1B:
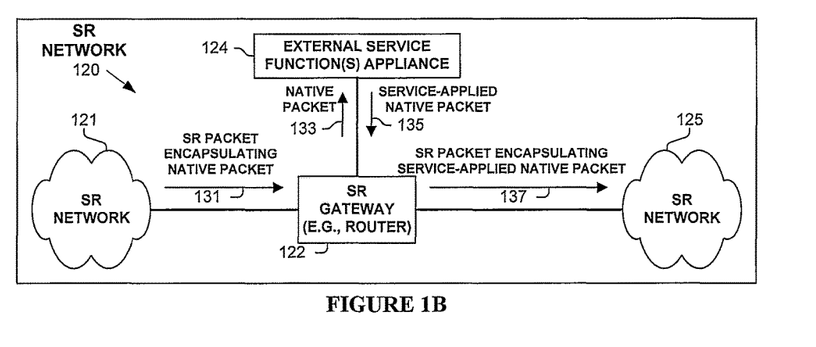
FIG. 1B illustrates a network operating according to one embodiment.

FIG. 1B illustrates SR network 120 operating according to one embodiment. As shown, SR network 120 includes SR networks 121 and 125 (which are the same network in one embodiment) communicatively coupled to SR gateway (e.g., router) 122, which is communicatively coupled to an external service function appliance 124 (which can apply one or more services to a packet). In one embodiment, service function appliance 124 is not SR-capable, hence relies on SR gateway 122 for participating in the SR network.

As shown and in one embodiment, SR gateway 122 receives an SR packet encapsulating a native packet (131). Based on the active segment of the packet, SR gateway 122 determines to, and sends the encapsulated native packet (133) to service function 124, which applies one or more services to the native packet. In one embodiment, the interface on which service function 124 receives the native packet identifies the one or more services applied to the native packet. In one embodiment, service function 124 classifies the native packet to identify the one or more services to apply to the native packet. Afterwards, the (non-dropped) service-applied native packet is returned (135) to SR gateway 122. SR gateway 122, having stored the SR encapsulating header (typically after updating to the next segment) corresponding to the native packet, generates the SR packet encapsulating the service-applied native packet and sends (137) this SR packet to SR network 125. In one embodiment, the interface on which SR gateway 122 receives the service-applied native packet identifies the SR encapsulating header. In one embodiment, SR gateway 122 classifies the service-applied native packet to identify the SR encapsulating header.

Figure 1C:
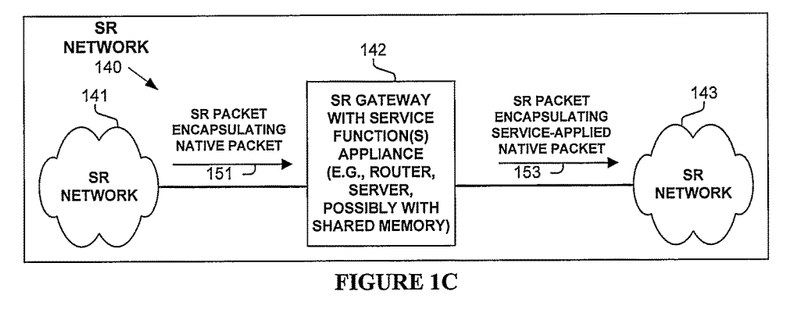
FIG. 1C illustrates a network operating according to one embodiment.

FIG. 1C illustrates SR network 140 operating according to one embodiment. As shown, SR network 140 includes SR networks 141 and 143 (which are the same network in one embodiment) communicatively coupled to SR gateway with service function appliance 142 (e.g., router, server), possibly with shared memory or a communications mechanism (e.g., switching fabric) between the SR gateway and the service function.

In one embodiment, SR gateway with service function appliance 142 receives an SR packet encapsulating a native packet (151). Based on the active segment of the packet, the native packet is communicated within appliance 142 to the service function, which applies one or more services to the native packet. Afterwards, the (non-dropped) service-applied native packet is returned to the SR gateway. The SR gateway, having stored the SR encapsulating header (typically after updating to the next segment) corresponding to the native packet, generates the SR packet encapsulating the service-applied native packet and sends (153) this SR packet to SR network 143.

Figure 1D:
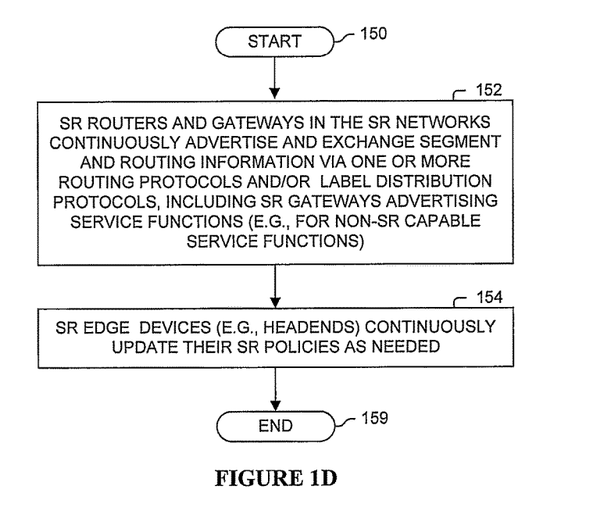
FIG. 1D illustrates a process according to one embodiment.

FIG. 1D illustrates a process according to one embodiment. Processing begins with process block 150. In process block 152, SR routers and gateways in the SR networks continuously advertise and exchange segment and routing information via one or more routing protocols and/or via one or more label distribution protocols. In one embodiment, this includes SR gateways advertising service functions for service functions (e.g., non-SR capable service functions). In process block 154, SR edge devices (e.g., SRv6 headends) continuously update their SR policies as needed. Processing of the flow diagram of FIG. 1D is complete as indicated by process block 159.

Figure 2A:
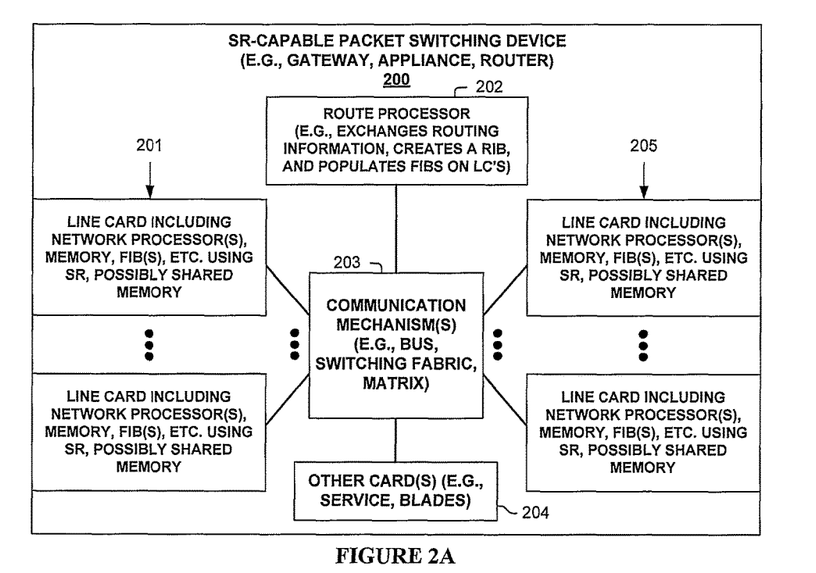
FIG. 2A illustrates a packet switching device according to one embodiment.
Figure 2B:
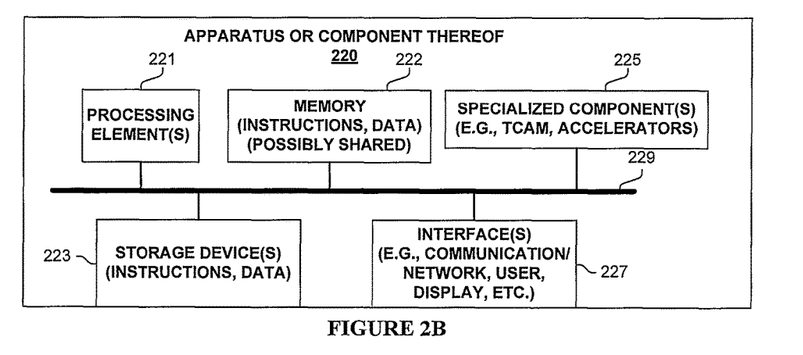
FIG. 2B illustrates an apparatus according to one embodiment.

FIGS. 2A-B and their discussion herein provide a description of various SR gateway and service functions according to one embodiment.

FIG. 2A illustrates one embodiment of an SR-capable packet switching device 200 (e.g., SR gateway, appliance, router, possibly with one or more service functions) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with a SR gateway and/or service function. Packet switching device 200 also has a control plane with one or more processing elements 202 for managing the control plane and/or control plane processing of packets associated with a SR gateway. Packet switching device 200 also includes other cards 204 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with a SR gateway, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, an SR gateway and service functions are implemented on a line card 201, 205.

FIG. 2B is a block diagram of an apparatus 220 used in one embodiment associated with a SR gateway and/or service function. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
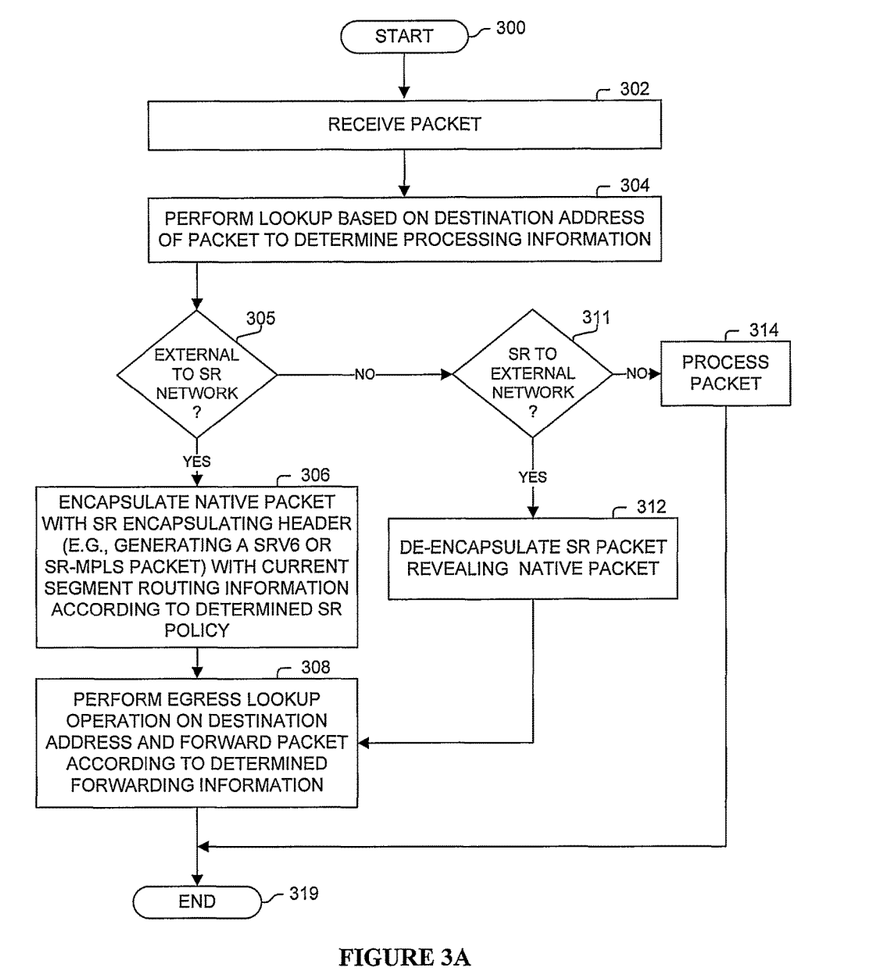
FIG. 3A illustrates a process according to one embodiment.

FIG. 3A illustrates a process performed by an SR edge router according to one embodiment. Processing begins with process block 300. In process block 302, a packet is received. In process block 304, a lookup operation is performed on the destination address of the received packet to determine processing information. As determined in process block 305, if the packet was received on an external network interface and to be sent into an SR network, then processing proceeds to process block 306, else processing proceeds to process block 311. As determined in process block 311, if the packet was received on an SR network interface and to be sent to an external network, then processing proceeds to process block 312, else processing proceeds to process block 314 wherein the packet is processed normally and processing proceeds to process block 319.

Continuing in process block 306, the native packet is encapsulated into an SR packet with a SR encapsulating header with current SR information according to a corresponding policy, and processing proceeds to process block 308. Continuing in process block 312, the native packet is removed from being encapsulated in the received SR packet, and processing proceeds to process block 308. Continuing with process block 308, an egress lookup operation is performed on the destination address of the outbound SR or native packet to determine forwarding information, with the packet forwarded accordingly. Processing proceeds to process block 319.

Continuing in process block 319, processing of the flow diagram of FIG. 3A is complete as indicated by process block 319.

Figure 3B:
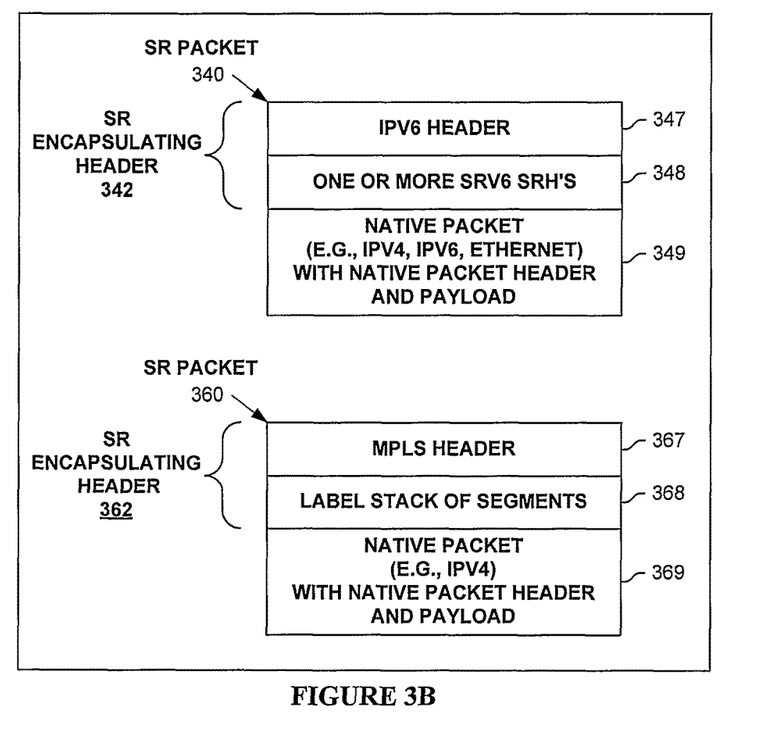
FIG. 3B illustrates different Segment Routing (SR) packet formats according to one embodiment.

FIG. 3B illustrates two Segment Routing (SR) packets 340 and 360 according to one embodiment. As shown, SR packet 340 (e.g. SRv6 packet) includes an SR encapsulating header 342 and native packet 349. SR encapsulating header 342 includes an IPv6 header 347 and one or more SR headers (SRHs) 348. As shown, SR packet 360 (e.g. SR-MPLS packet) includes an SR encapsulating header 362 and native packet 369. SR encapsulating header 362 includes an MPLS header 367 and a label stack of segments 368.

Figure 3C:
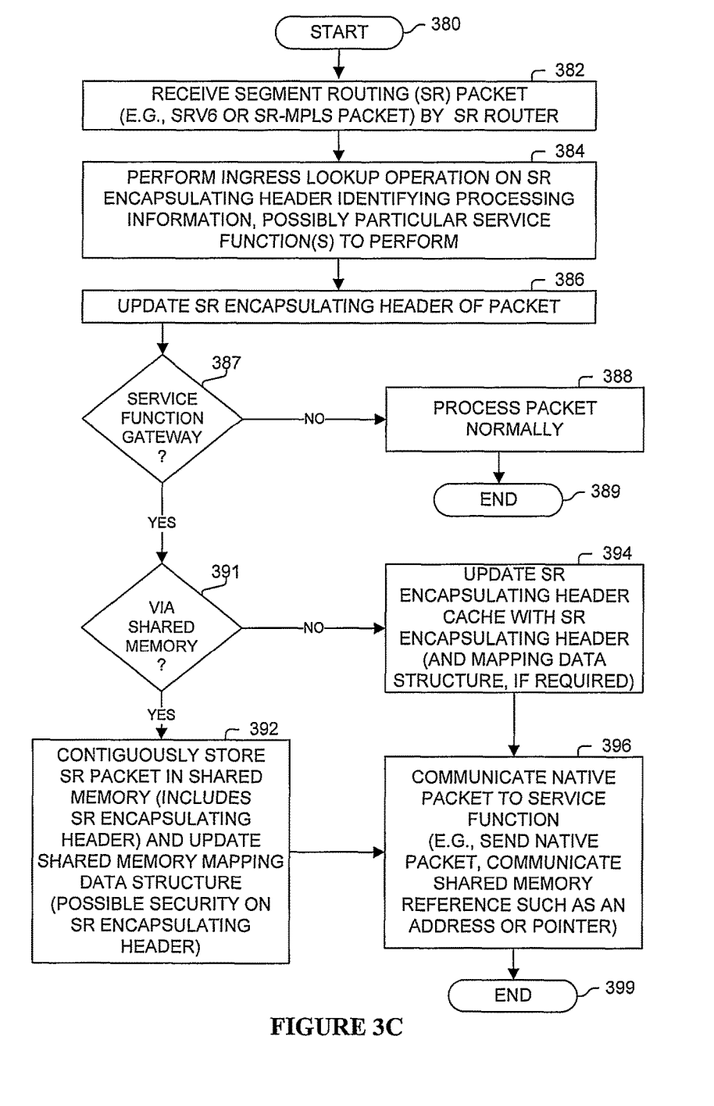
FIG. 3C illustrates a process according to one embodiment.

FIG. 3C illustrates a process performed by a SR gateway according to one embodiment. Processing begins with process block 380. In process block 382, a SR packet is received. In process block 384, an ingress lookup operation is performed on the destination address of the SR encapsulating header identifying packet processing information, possibly identifying one or more service functions. In process block 386, the SR encapsulating header is updated to the next active segment.

As determined in process block 387, if a service function is to be performed, then processing proceeds to process block 391, else the packet is processed normally in process block 388 and processing of the flow diagram of FIG. 3C is complete as indicated by process block 389.

Continuing with and as determined in process block 391, if the native packet is to be communicated from the gateway to the service function via shared memory, then processing proceeds to process block 392, else to process block 394.

Continuing in process block 394, the SR encapsulating header cache is updated with the SR encapsulating header, and updating the mapping data structure mapping the active segment to the SR encapsulating header if required. Processing proceeds to process block 396.

Figure 4:
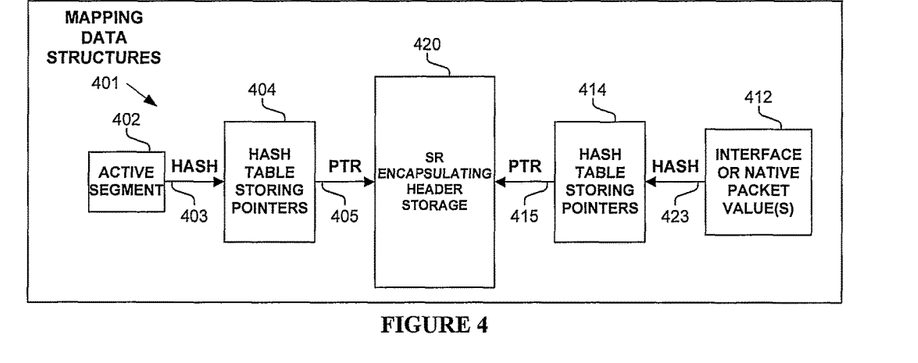
FIG. 4 illustrates mapping data structures according to one embodiment.

FIG. 4 illustrates mapping data structures 401 to identify a stored encapsulating header in SR encapsulating header storage 420 according to one embodiment. Active segments 402 (e.g., SRv6 or MPLS SID) are hashed resulting in hash values 403 into hash table 404 storing pointers 405 to corresponding stored encapsulating headers in SR encapsulating header storage 420. Thus, a gateway receiving an SR packet identifies the storage location for storing the stored encapsulating header (e.g., provides for updating of a SR policy for a segment based on a subsequently received SR packet with a same active segment).

Additionally, interfaces or values 412 from the header of a native packet (e.g., a five-tuple) received by a gateway from a service function are hashed resulting in hash values 423 into hash table 414 storing pointers 415 to corresponding stored encapsulating headers in SR encapsulating header storage 420. Thus, a gateway receiving a native packet identifies the storage location for the corresponding stored encapsulating header for generating the SR packet including the service-applied native packet.

Continuing in process block 392 of FIG. 3C, the received SR packet (including the SR encapsulating header) is stored in shared memory, with a shared memory mapping data structure for identifying the location of the start of the SR packet from the location of the start of the native packet updated accordingly. Processing proceeds to process block 396.

Figure 5A:
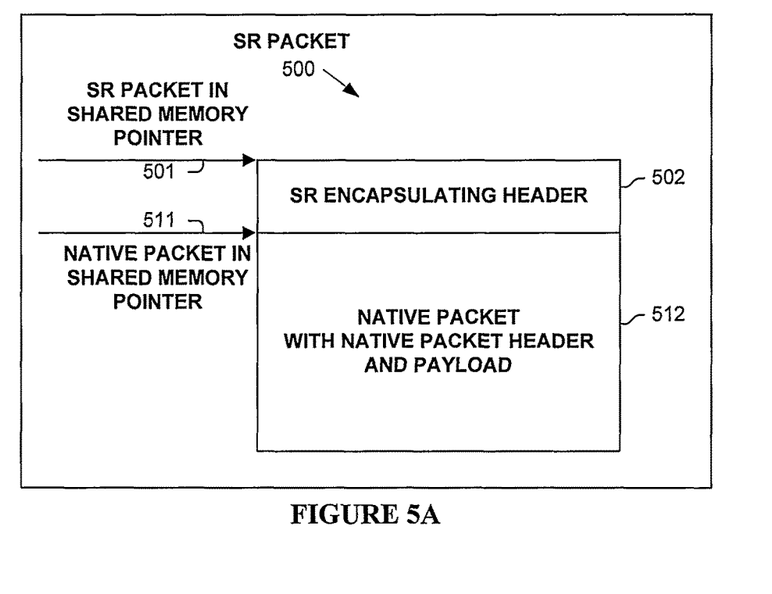
FIG. 5A illustrates a stored SR Packet according to one embodiment.

FIG. 5A illustrates a SR packet 500 stored in shared memory according to one embodiment. SR packet 500 is stored with SR encapsulating header 502 (beginning at location 501) is stored contiguous with native packet 512 (beginning at location 511).

Figure 5B:
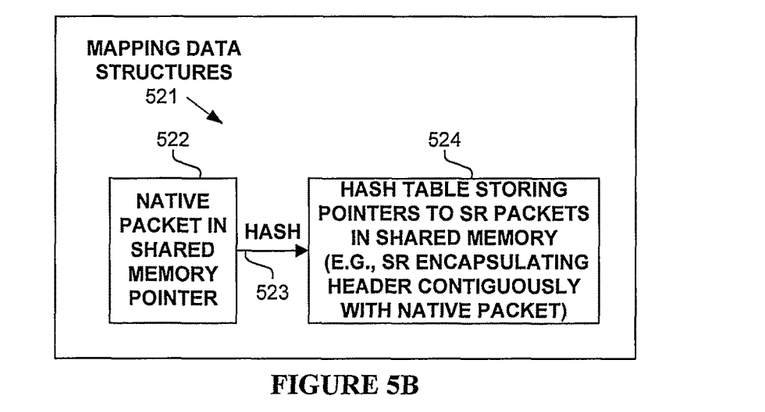
FIG. 5B illustrates mapping data structures according to one embodiment.

FIG. 5B illustrates mapping data structures 521 used in conjunction with shared memory communication between a service function and SR gateway according to one embodiment. As shown, native packet pointers 522 are hashed (523) into hash table 524 storing pointers to the beginning of the corresponding SR packets.

Continuing in process block 396 of FIG. 3C, the native packet is communicated to the service function (e.g., send native packet, communicate shared memory reference). Processing of the flow diagram of FIG. 3C is complete as indicated by process block 399.

Figure 6:
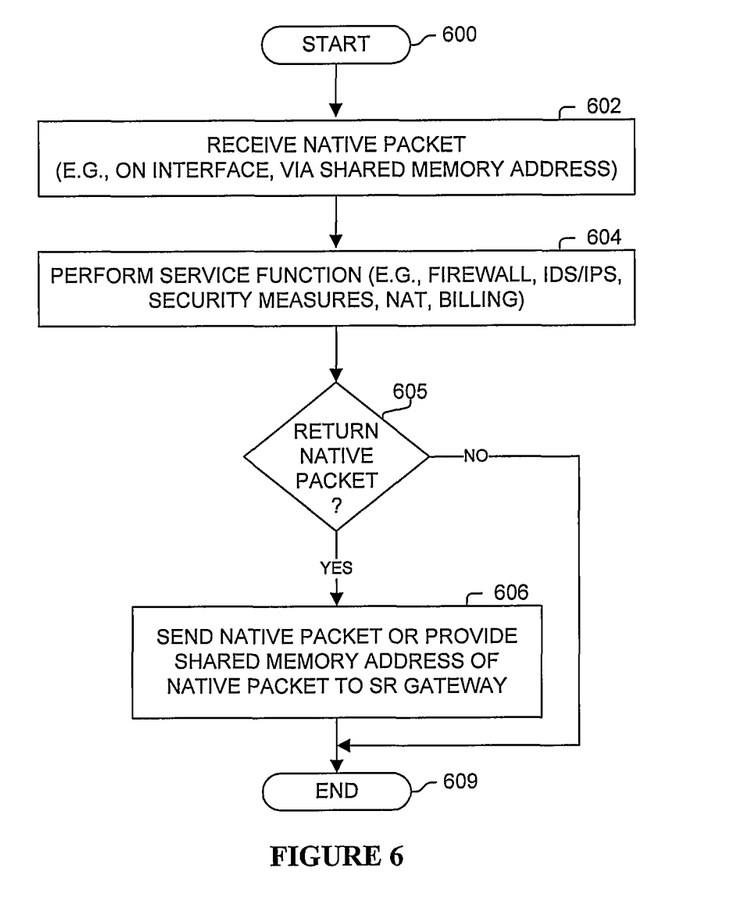
FIG. 6 illustrates a process according to one embodiment.

FIG. 6 illustrates a process performed by a service function according to one embodiment. Processing begins with process block 600. In process block 602, a native packet is received (e.g., on an interface, via shared memory). In process block 604, the service function applies one or more services on the native packet. Examples of the service applied by a service function include, but are not limited to, firewall, intrusion detection, intrusion protection, security, parental control, network address translation, billing, or update of information related to a size or other characteristic of the native packet. As determined in process block 605, if the packet is to be returned to the SR gateway (e.g., not dropped), then in process block 606, the service-applied native packet is communicated by sending or via shared memory to the gateway. Processing of the flow diagram of FIG. 6 is complete as indicated by process block 609.

Figure 7:
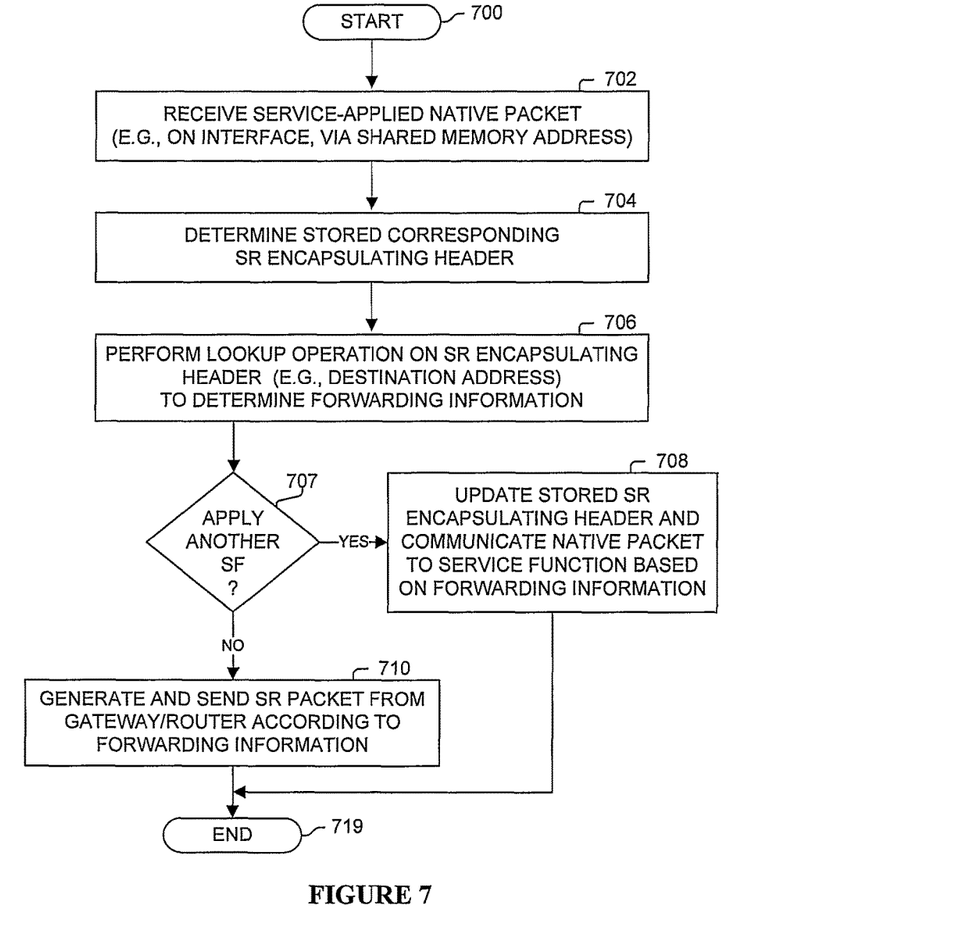
FIG. 7 illustrates a process according to one embodiment.

FIG. 7 illustrates a process performed by a SR gateway according to one embodiment. Processing beings with process block 700. In process block 702, a service-applied native packet is received by the SR gateway (e.g., on an interface, via shared memory). In process block 704, the corresponding stored SR encapsulating header is determined. In process block 706, a lookup operation is performed on the SR encapsulating header (e.g., on the destination address) to determine processing (e.g., forwarding) information. As determined in process block 707, if another service is to be applied to the native packet, then processing proceeds to process block 708; else to process block 710. Continuing in process block 708, the stored SR encapsulating header is updated and the native packet is communicated to the corresponding service function based on the processing information. Continuing in process block 710, an SR packet is generated with the SR encapsulating header and service-applied native packet and forwarded according to the forwarding information. Processing of the flow diagram of FIG. 7 is complete as indicated by process block 719.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving, by a segment routing (SR) gateway that is SR-capable, a SR packet encapsulating a native packet, with the SR packet including a particular SR encapsulating header comprising a SRv6 segment identifier (SID) or Multiprotocol Label Switching (MPLS) segment;
   updating the particular SR encapsulating header by the SR gateway to a next SID or a next MPLS segment to send the SR packet;
   storing the particular SR encapsulating header in storage by the SR gateway;
   subsequent to said storing the SR encapsulating header, the SR gateway communicating the native packet to a service function;
   acquiring the native packet by the SR gateway from the service function; and
   subsequent to both said updating the particular SR encapsulating header and acquiring the native packet: generating a particular SR packet with the particular SR encapsulating header and with the particular SR packet encapsulating the native packet; determining forwarding information based on the particular SR encapsulating header; and sending the particular SR packet from the SR gateway according to said forwarding information.

2. The method of claim 1, wherein said updating the particular SR encapsulating header is performed prior to said storing the particular SR encapsulating header by the SR gateway.

3. The method of claim 1, wherein said communicating the native packet includes the SR gateway sending the packet from the SR gateway; and wherein said acquiring the native packet includes receiving the native packet by the SR gateway.

4. The method of claim 1, wherein said storage is shared storage accessible to both the SR gateway and the service function; and wherein said communicating the native packet includes providing to the service function an outgoing reference to the native packet in said shared storage.

5. The method of claim 4, wherein said acquiring the native packet includes receiving an incoming reference to the native packet in said shared storage.

6. The method of claim 1, wherein said storage is shared storage accessible to both the SR gateway and the service function; and wherein said generating the particular SR packet includes reading the SR packet from said shared storage.

7. The method of claim 6, wherein said communicating the native packet includes the SR gateway providing to the service function an outgoing reference to the native packet in said shared storage.

8. The method of claim 7, wherein said acquiring the native packet includes receiving an incoming reference to the native packet in said shared storage.

9. The method of claim 6, comprising: encrypting the particular SR encapsulating header prior to said storing the particular SR encapsulating header by the SR gateway; and wherein said generating the particular SR packet includes decrypting the particular SR encapsulating header.

10. The method of claim 6, comprising: determining an outgoing verification value based on the particular SR encapsulating header prior to said storing the SR packet in shared storage; and determining an incoming verification value based on the particular SR encapsulating header subsequent to said acquiring the native packet; wherein said generating the particular SR packet is performed in response to determining that the particular SR encapsulating header has not been modified in said shared storage based on the outgoing and incoming verification values.

11. The method of claim 1, comprising:
    receiving a second SR packet related to the SR packet, with the second SR packet including a second particular SR encapsulating header; and
    updating the particular SR encapsulating header in storage based on the second particular SR encapsulating header.

12. The method of claim 11, wherein the second particular SR encapsulating header is different than the particular SR encapsulating header as included in the SR packet when received by the SR gateway.

13. The method of claim 12, wherein said updating the particular SR encapsulating header is performed in response to determining that the second particular SR encapsulating header is different than the particular SR encapsulating header as included in the SR packet when received by the SR gateway.

14. The method of claim 11, wherein said updating the particular SR encapsulating header in storage includes overwriting the particular SR encapsulating header with the second particular SR encapsulating header.

15. The method of claim 1, comprising: the service function applying a service to the native packet subsequent to said communicating the native packet to the service function and prior to said acquiring the native packet by the SR gateway from the service function.

16. The method of claim 15, wherein said applying the service modifies the native packet.

17. The method of claim 15, wherein the service includes firewall, intrusion detection, intrusion protection, security, parental control, network address translation, billing, or update of information related to a size or other characteristic of the native packet.

18. A method, comprising:
    receiving, by a segment routing (SR) gateway, a first SR packet encapsulating a first native packet, with a first SR encapsulating header being the SR encapsulating header of the first SR packet;
    storing, by the SR gateway, the first SR encapsulating header in storage;
    sending the first native packet from the SR gateway;
    receiving, by the SR gateway, a second SR packet encapsulating a second native packet, with the second SR encapsulating header being the SR encapsulating header of the second SR packet, with the first and second SR encapsulating headers being different;
storing, by the SR gateway, the second SR encapsulating header in storage;
receiving the first native packet by the SR gateway;
generating a first outbound SR packet with the second SR encapsulating header retrieved from storage as the SR encapsulating header of the first outbound SR packet, with the first outbound SR packet encapsulating said received first native packet;
sending from the SR gateway the first outbound SR packet;
receiving the second native packet by the SR gateway;
generating a second outbound SR packet with the second SR encapsulating header retrieved from storage as the SR encapsulating header of the second outbound SR packet, with the second outbound SR packet encapsulating said received second native packet; and
sending from the SR gateway the second outbound SR packet.

19. An apparatus, comprising:
one or more hardware interfaces sending and receiving packets; and
one or more network processors with memory associated therewith;
wherein the apparatus performs packet processing operations including segment routing-capable (SR-capable) packet processing operations including as an SR gateway, with said packet processing operations including:
receiving on an interface of said one or more hardware interfaces a SR packet encapsulating a native packet and including a particular SR encapsulating header comprising one or more SRv6 segment identifiers (SIDs) or one or more Multiprotocol Label Switching (MPLS) segments;
updating a particular SR encapsulating header to a next SID or a next MPLS segment to which to send the SR packet;
storing the particular SR encapsulating header in memory;
decapsulating the native packet;
communicating the native packet to the service function;
acquiring the native packet by the SR gateway from the service function;
retrieving the particular SR encapsulating header from memory to include in a particular SR packet;
subsequent to said retrieving the particular SR encapsulating header and said updating the particular SR encapsulating header: generating the particular SR packet, with the particular SR encapsulating header as the SR encapsulating header of the particular SR packet, and with the particular SR packet encapsulating said acquired native packet, determining forwarding information based on the particular SR encapsulating header; and sending the particular SR packet from the apparatus on an interface of said one or more hardware interfaces according to said forwarding information.

20. The apparatus of claim 19, wherein said communicating the native packet includes sending the packet from the apparatus on an interface of said one or more hardware interfaces; and wherein said acquiring the native packet includes receiving the native packet on an interface of said one or more hardware interfaces.

* * * * *